United States Patent Office 3,300,515
Patented Jan. 24, 1967

3,300,515
STABILIZED BIS- AND TRIS-($\beta$-SULFATOALKYL) SULFONIUM INNER SALTS
William Baird, deceased, late of Manchester, England, by Ida Baird, executrix, Bury, England, and Alexander Parkinson, Manchester, England, assignors to Imperial Chemical Industries Limited, London, England, a corporation of Great Britain
No Drawing. Filed Oct. 31, 1963, Ser. No. 320,562
Claims priority, application Great Britain, Nov. 2, 1962, 41,528/62
12 Claims. (Cl. 260—327)

This invention relates to a process for improving the chemical stability of salts of bis- or tris-($\beta$-sulphatoalkyl) sulphonium inner salts.

By the salts of bis- or tris-($\beta$-sulphatoalkyl) sulphonium inner salts we mean the salts of inner salts which have the general formula

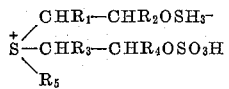

wherein $R_1$, $R_2$, $R_3$, $R_4$ and $R_5$ are as hereinafter defined.

In the above formula $R_1$, $R_2$, $R_3$ and $R_4$ may be the same or different and may be hydrogen or a lower akyl group, the lower alkyl group preferably containing from 1 to 3 carbon atoms. $R_5$ may be the group

or a straight or branched chain substituted or unsubstituted alkyl, or a substituted or unsubstituted alkenyl, aryl, aralkyl, alicyclic, or heterocyclic group as defined below.

The straight or branched chain alkyl groups from which $R_5$ may be selected may contain up to 22 carbon atoms but it is preferred that they contain from 1 to 18 carbon atoms. By a substituted alkyl group we mean the group ($CHR_3$—$CHR_4OH$) or a straight or branched chain alkyl group which may contain up to 22 carbon atoms and contain as substituents for example hydroxyl, carboxyl, ethyl, ester, mercapto, thioether, keto, cyano, sulphonic acid or sulphuric ester groups.

By alkenyl groups we mean aliphatic hydrocarbon groups which contain one double bond for example vinyl, methylvinyl or allyl groups. By aryl groups we mean those groups which are derived from a member of the benzene or naphthalene series, for example phenyl or naphthyl groups. By aralkyl groups we mean alkyl groups which are themselves substituted by an aryl group for example the benzyl group. By alicyclic groups we mean groups which contain a non-benzenoid cyclic carbon ring, for example the cyclohexyl group. By heterocyclic groups we mean groups which contain a closed ring system containing at least one atom of an element other than carbon, e.g. oxygen, sulphur or nitrogen, such as for example the pyridyl or quinolyl groups. Any of the aforementioned groups may contain as substituents for example hydroxyl, carboxyl, ether, ester, mercapto, thioether, keto, cyano, sulphonic acid or sulphuric ester groups.

The alkali or alkaline earth salts of bis- or tris-$\beta$-sulphatoalkylsulphonium inner salts may be isolated as white crystalline powders, for example by evaporation of their solutions in aqueous methanol under reduced pressure but the products so obtained are hygroscopic and rapidly lose their character as readily handled free flowing powders. It has been found preferable to manufacture and isolate the salts of the bis- or tris-($\beta$-sulphatoalkyl)-sulphonium inner salts as aqueous solutions as described in our U.S. Patents 3,187,008 and 3,190,891.

The sulphatoalkylsulphonium inner salts are very readily decomposed in alkaline solutions and it is necessary to isolate the products at an acid pH. Decomposition of the sulphatoalkylsulphonium salts still occurs, to some extent, howver, under acid conditions, the rate being accelerated at elevated temperatures. We have now found that in acid solution the rate of decomposition of the sulphatoalkylsulphonium inner salts is greater both at a high acid pH, for example 3.5 to 7, and at a low acid pH, for example 0.5 to 2, than in the range of pH from 2 to 3.5, and that the stability of the solutions is improved by adjusting to a pH value within the range 2.0 to 3.5 and preferably within the range 2.7 to 3.3 in the presence of a buffer system adapted to maintain the pH value of the solution within this range and especially in the presence of small amounts of weak acids and/or their ammonium, alkali or alkaline earth salts.

Thus according to our invention we provide aqueous solutions of the salts of bis- or tris-($\beta$-sulphatoalkyl) sulphonium inner salts containing a buffer system adapted to maintain the pH of the solution within the range 2.0 to 3.5 and preferably within the range 2.7 to 3.3. Our invention also includes a process for improving the chemical stability of aqueous solutions of the salts of bis- or tris-($\beta$-sulphatoalkyl) sulphonium inner salts which comprises adding thereto a weak acid or an ammonium, alkali or alkaline earth salt of a weak acid and adjusting the pH to a value within the range 2.0 to 3.5 and preferably within the range 2.7 to 3.3.

By weak acids we mean mono basic acids in which the pK value is not less than 2.0 nor greater than 5.0, for instance formic acid (pK 3.7) and acetic acid (pK 4.7), and polybasic acids in which the pK value of the first hydrogen atom is not less than 2.0 nor greater than 5.0, for example, phosphoric acid ($pK_1$ 2.15), citric acid ($pK_1$ 3.1), tartaric acid ($pK_1$ 3.0) succinic acid ($pK_1$ 4.0) and maleic acid ($pK_1$ 2.9). The amount of the weak acid or salt of a weak acid added to the aqueous solution is a small percentage of the weight of the solution preferably from 0.25% to 5%. The acids which are preferred in this invention are those in which the pK value of the first or sole hydrogen has a value between 2 and 4. As examples of preferred acids there may be mentioned in particular formic acid, pK 3.7, and citric acid, $pK_1$ 3.1.

Particularly preferred as buffer systems for use in our invention are mixtures of one of more weak acids with the corresponding ammonium, alkali metal or alkaline earth metal salts. The acid and the ammonium, alkali metal or alkaline earth metal salts or solutions thereof, may be added to the aqueous solutions of the salts of the bis- or tris-($\beta$-sulphatoalkyl)sulphonium inner salts but it is preferred that the free acid is added to a partially neutralised aqueous solution of a bis- or tris-($\beta$-sulphatoalkyl)sulphonium inner salt, at a pH of approximately 2.0 to 2.5, the pH of the solution then being adjusted to the desired value, say 2.7 to 3.3, by addition of an alkali, especially sodium bicarbonate.

The invention is illustrated but not limited by the following examples in which parts and percentages are by weight.

*Example 1*

To a 20% aqueous solution of disodium tris-($\beta$-sulphatoethyl)sulphonium inner salt prepared by the method of Example 5 of our U.S. Patent 3,187,008 were added the amounts of acid shown in the following table and the pH values of the solutions were then adjusted to the given values using solid sodium bicarbonate. Samples of the solutions were stored at 25° C. to 45° C. and 65° C., aliquots being taken at regular intervals and analysed for their content of disodum tris-($\beta$-sulphatoethyl)sulphonium inner salt. The samples were ranked in order of chemical stability, 1 indicating least loss of product and 8 indicating most loss of product. (=1 and =2 indicate that the difference in stability were within or of the order of the limits of accuracy of the analytical method.

| Initial pH | Acid used and amount | Order of chemical stability |
|---|---|---|
| 3.5 | 2% w./w. phosphoric | 7 |
| 3.5 | 5% w./w. phosphoric | 8 |
| 5.0 | 2% w./w. acetic | 5 |
| 5.0 | 5% w./w. acetic | 6 |
| 4.0 | 2% w./w. formic | 3 |
| 4.0 | 5% w./w. formic | 4 |
| 3.0 | 2% w./w. formic | =2 |
| 3.0 | 5% w./w. formic | =1 |
| 3.0 | 2% w./w. citric | =2 |
| 3.0 | 5% w./w. citric | =1 |
| 2.0 | 2% w./w. formic | =2 |
| 2.0 | 5% w./w. formic | =1 |
| 2.0 | 2% w./w. citric | =2 |
| 2.0 | 5% w./w. citric | =1 |
| 1.5 | 5% w./w. formic | 9 |
| 1.0 | 5% w./w. formic | 10 |

Example 2

To a 20% aqueous solution of disodium tris-(β-sulphatoethyl)sulphonium inner salt prepared by the method of Example 1 of our U.S. Patent 3,190,891 and at a pH of 2.5 was added the amounts of acid shown in the following table and the pH values of the solutions were then readjusted to pH 2.5 with solid sodium bicarbonate. The samples were then stored and analysed as described in Example 1. The chemical stabilities are summarised in the following table:

| Initial pH | Acid used and amount | Order of chemical stability |
|---|---|---|
| 2.5 | None | 3 |
| 2.5 | 2% citric | 1 |
| 2.5 | 2% formic | 2 |

Example 3

A 20% aqueous solution of disodium tris-(β-sulphatoethyl)sulphonium inner salt prepared by the method of Example 8 of our U.S. Patent 3,187,008 was cooled to 0–2° C. and filtered from a crystalline precipitate of sodium sulphate decahydrate. Samples of the solution were then treated with various acids and adjusted to various pH values as summarised in the following table. The solutions were stored at 45° C. and aliquots analysed at intervals. The chemical stabilities are summarised in the following table:

| Initial pH | Acid used and amount | Order of chemical stability |
|---|---|---|
| 3.2 | 2% w./w. citric | 5 |
| 3.2 | 5% w./w. citric | 2 |
| 3.2 | 2% w./w. formic | 4 |
| 3.2 | 5% w./w. formic | 1 |
| 3.2 | 2% w./w. tartaric | 3 |
| 3.3 | None | 6 |

Example 4

A 35% aqueous solution of disodium tris-(β-sulphatoethyl)sulphonium inner salt prepared by the method of Example 1 of our U.S. Patent No. 3,190,891 was cooled to 0–5° C. and filtered from a crystalline precipitate of sodium sulphate decahydrate. Samples of the solution were then treated with various acids and the pH values adjusted as summarised in the following table. The solutions were stored at 45° C. and aliquots analysed at intervals. The chemical stabilities are summarised in the following table:

| Initial pH | Acid used and amount | Order of chemical stability |
|---|---|---|
| 3.0 | 2% w./w. citric | =4 |
| 3.0 | 5% w./w. citric | 2 |
| 3.0 | 2% w./w. formic | =4 |
| 3.0 | 5% w./w. formic | 1 |
| 3.0 | 2% w./w. tartaric | 3 |
| 3.0 | 5% w./w. acetic | 5 |
| 3.0 | None | 6 |

We claim:

1. Aqueous solutions of sulphonium inner salts of the formula

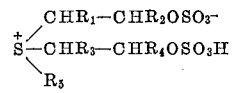

wherein $R_1$, $R_2$, $R_3$ and $R_4$ independently represent a member selected from the class consisting of hydrogen atoms and lower alkyl groups containing from 1 to 3 carbon atoms, and $R_5$ represents a member selected from the class consisting of the group $$(CHR_3CHR_4OSO_3H)$$

alkyl groups containing from 1 to 22 carbon atoms, vinyl, methylvinyl, allyl, phenyl, naphthyl, benzyl, cyclohexyl, pyridyl and quinolyl groups, said solutions being maintained at a pH within the range 2.0 to 3.5 by means of a buffer system comprising a mixture of at least one weak acid with at least one compound selected from the class consisting of the ammonia, alkali metal and alkaline earth metal salts of weak acids.

2. Aqueous solutions as claimed in claim 1 wherein the solution pH is maintained within the range 2.7 to 3.3.

3. Aqueous solutions as claimed in claim 1 wherein said weak acids are selected from the group consisting of formic acid and citric acid.

4. Aqueous solutions according to claim 1 wherein the buffer system comprises a mixture of a compound selected from the class consisting of formic acid and citric acid with the sodium salt of the said compound.

5. Aqueous solutions according to claim 1 wherein the total weight of weak acids and ammonium, alkali and alkaline earth salts of weak acids dissolved therein is from 0.25% to 5.0% of the weight of the solution.

6. Aqueous solutions according to claim 1 wherein the salt of the poly-(β-sulphatoalkyl)sulphonium inner salt is disodium tris-(β-sulphatoethyl)sulphonium inner salt.

7. Aqueous solutions as claimed in claim 1 wherein said weak acids have a pK value for the sole or first acidic hydrogen atom which is within the range of 2.0 to 5.0.

8. Aqueous solutions as claimed in claim 7 wherein said pK value is within the range 2.0 to 4.0.

9. An aqueous solution of disodium tris-(β-sulphatoethyl)sulphonium inner salt at a pH within the range 2.0 to 3.5 and containing from 0.25% to 5.0% of a buffer comprising a mixture of a compound selected from the class consisting of formic acid and citric acid with the sodium salt of the said compound.

10. A process for improving the chemical stability of aqueous solutions of sulphonium inner salts of the formula

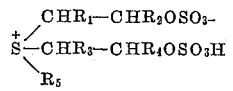

wherein $R_1$, $R_2$, $R_3$ and $R_4$ independently represent a member selected from the class consisting of hydrogen atoms and lower alkyl groups containing from 1 to 3 carbon atoms, and $R_5$ represents a members selected from the class consisting of the group ($CHR_3CHR_4OSO_3H$), alkyl groups containing from 1 to 22 carbon atoms, vinyl, methylvinyl, allyl, pehnyl, naphthyl, benzyl, cyclohexyl, pyridyl and quinolyl groups, comprising adding to an aqueous solution of said salts a mixture of at least one weak acid with at least one compound selected from the group consisting of the ammonia, alkali metal and alkaline earth metal salts of weak acids, and adjusting the solution pH to a value within the range of 2.0 to 3.5.

11. The process as claimed in claim 10 wherein the weak acid is selected from the group consisting of formic acid and citric acid, and the weak acid salt compoun is sodium bicarbonate.

12. Process according to claim 11 wherein the su phonium inner salt is disodium tris-($\beta$-sulphatoethyl)-su phonium inner salt.

No references cited.

CHARLES B. PARKER, *Primary Examiner.*

F. D. HIGEL, *Assistant Examiner.*